US010699129B1

(12) United States Patent
Jiang et al.

(10) Patent No.: US 10,699,129 B1
(45) Date of Patent: Jun. 30, 2020

(54) SYSTEM AND METHOD FOR VIDEO CAPTIONING

(71) Applicant: Fudan University, Shanghai (CN)

(72) Inventors: Yugang Jiang, Shanghai (CN); Shaoxiang Chen, Shanghai (CN)

(73) Assignee: FUDAN UNIVERSITY, Shanghai (CN)

(*) Notice: Subject to any disclaimer, the term of this patent is extended or adjusted under 35 U.S.C. 154(b) by 0 days.

(21) Appl. No.: 16/686,087

(22) Filed: Nov. 15, 2019

(51) Int. Cl.
*G06K 9/00* (2006.01)
*G06K 9/62* (2006.01)
*G06N 3/04* (2006.01)
*G06N 3/08* (2006.01)

(52) U.S. Cl.
CPC ..... *G06K 9/00751* (2013.01); *G06K 9/00718* (2013.01); *G06K 9/6232* (2013.01); *G06N 3/0445* (2013.01); *G06N 3/0454* (2013.01); *G06N 3/0481* (2013.01); *G06N 3/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 2017/0262995 A1* | 9/2017 | Li | ........................ | G06N 3/0445 |
| 2018/0189572 A1* | 7/2018 | Hori | ..................... | G06N 3/0454 |
| 2018/0336466 A1* | 11/2018 | Braun | ..................... | G06N 3/08 |
| 2019/0130206 A1* | 5/2019 | Trott | .................. | G06F 16/3329 |

OTHER PUBLICATIONS

Liu et al., "A Fine-Grained Spatial-Temporal Attention Model for Video Captioning", Nov. 5, 2018, IEEE (Year: 2018).*
Zhang et al., "Neural Machine Translation With GRU-Gated Attention Model", 2019, IEEE (Year: 2019).*
Rodriguez et al., "Attend and Rectify a gated attention mechanism for fine-grained recovery", 2018, Computer Vision Foundation (Year: 2018).*
Zheng et al., "Automatic Generation of News Comments Basedon Gated Attention Neural Networks", Nov. 17, 2017, IEEE (Year: 2017).*
Shen et al., "Bi-Directional Block Self-Attention for Fast and Memory-Efficient Sequence Modeling", 2018, ICLR (Year: 2018).*
Zhao et al., "CAM-RNN Co-Attention Model Based RNN For Video Captioning", May 20, 2019, IEEE (Year: 2019).*
Zhang et al., "GaAN Gated Attention Networks for Learning on Large and Spatiotemporal Graphs", Mar. 20, 2018 (Year: 2018).*

(Continued)

*Primary Examiner* — Zhiyu Lu
(74) *Attorney, Agent, or Firm* — Brad Bertoglio; Intelink Law Group PC

(57) ABSTRACT

For video captioning, with an encoding module and a decoding module, the encoding module comprises a plurality of encoding units each receiving a set of video frames, wherein the sets of video frames received by two neighboring encoding units are in chronological order; and the encoding units each producing a spatially attended feature, so that the plurality of encoding units produce a spatially attended feature sequence; and the decoding module comprises a decoding unit chronologically receiving a temporally attended feature obtained from the spatially attended features sequence. Also disclosed is a method thereof.

8 Claims, 3 Drawing Sheets
(3 of 3 Drawing Sheet(s) Filed in Color)

(56) References Cited

OTHER PUBLICATIONS

Song et al., "Hierarchical LSTM with Adjusted Temporal Attention for Video Captioning", Jun. 5, 2017 (Year: 2017).*
Song et al., "Hierarchical LSTMs with Adaptive Attention for Video Captioning", Aug. 26, 2015, IEEE (Year: 2015).*
Li et al., "MAM-RNN: Multi-level Attention Model Based RNN for Video Captioning", Nov. 20, 2018, IJCAI-17 (Year: 2018).*
Pei et al., "Memory-Attended Recurrent Network for Video Captioning", Jun. 1, 2019, Computer Vision Foundation (Year: 2019).*
Cao et al., "Multiple-Weight Recurrent Neural Networks", Aug. 2017, IJCAI-17 (Year: 2017).*
Gan et al., "Multi-step Reasoning via Recurrent Dual Attention for Visual Dialog", Jun. 4, 2019, Association for Computational Linguistics (Year: 2019).*
Xue et al., "Not All Attention Is Needed Gated Attention Network for Sequence Data", Dec. 1, 2019, Association for the Advancement of Artificial Intelligence (Year: 2019).*
Poleak et al., "Parallel Image Captioning Using 2D Masked Convolution", May 7, 2019, MDPI (Year: 2019).*
Chen et al., "Recurrent Neural Network-Based Sentence Encoder with Gated Attention for Natural Language Inference", Aug. 4, 2017, (Year: 2017).*
Hahn et al., "Tripping through time Efficient Localization of Activities in Videos", Sep. 12, 2019 (Year: 2019).*
Shaoxiang Chen and Yu-Gang Jiang, "Motion Guided Spatial Attention for Video Captioning", Association for the Advancement of Artificial Intelligence (published Jan. 2019).

* cited by examiner

SYSTEM AND METHOD FOR VIDEO CAPTIONING

TECHNICAL FIELD

This invention is related to a system for video captioning, and more particularly, by utilizing Motion Guided Spatial Attention (MGSA). This invention is also related to a method thereof.

BACKGROUND

Video captioning, i.e., automatically describing the content of a video using natural language, is a challenging task in computer vision. Lots of practical applications such as auxiliary aid for visually impaired people, human computer interaction, and video retrieval can benefit from video captioning, thus it has drawn great research attention. In general, video captioning systems can be roughly divided into two components: video representation and sentence generation.

Traditional approaches used various visual classifiers/trackers to detect visual concepts and then generate sentences with predefined language templates. For video representation, these approaches rely on handcrafted features which do not generalize well and cannot be trained in an end-to-end manner.

With the rapid development of deep learning, two major changes have been made to video captioning systems: convolutional neural networks (CNNs) for video representation and recurrent neural networks (RNNs) for sequence modeling. Earlier researchers directly extracted global feature (i.e., a single vector to represent one frame) of video frames from a pre-trained CNN and fed to RNNs for sentence generation. While these plain sequence-to-sequence approaches can achieve significant improvements over traditional methods, they still suffer from loss of both spatial and temporal information in videos.

Some works tried to exploit the temporal structure of videos by adaptively assigning weights to video frames at every word generation step, which is known as temporal attention. But in these works, video frames are still represented by global feature vectors extracted from CNNs. Thus, the rich visual contents in video frames are not fully exploited.

In "Translating videos to natural language using deep recurrent neural networks" (Venugopalan et al., NAACL, 2015), its system has adopted CNN and RNN for video captioning, in which video representation is obtained by mean-pooling CNN features extracted from a sequence of sampled video frames and then fed it to LSTM (Long Short-Term Memory) for caption generation. This approach actually treated video as an image and ignored the temporal structure of videos. Thus, following works try to encode the videos while exploiting their structures. "Sequence to sequence-video to text" (Venugopalan et al., ICCV, 2015) first encodes the video feature sequence with two layers of LSTM and then the language generation (decoding) is conditioned on the final encoding state. The LSTMs in these two stages share the same parameters. This kind of encoding-decoding approach has been successfully applied to neural machine translation (see "Sequence to sequence learning with neural networks", Sutskever et al., NIPS, 2014). In "Describing videos by exploiting temporal structure" (Yao et al., ICCV, 2015), it is exploited the temporal structure of a video by introducing soft-attention mechanism in the decoding stage, which assigns weights to video frames calculated from the decoder state and video features. In "Hierarchical boundary-aware neural encoder for video captioning" (Baraldi et al., CVPR, 2017), it is further proposed to model the hierarchical structure of videos by detecting the shot boundaries while generating captions. In "Bidirectional multirate reconstruction for temporal modeling in videos" (Zhu et al., CVPR, 2017), it is also proposed Multirate Gated Recurrent Unit to encode frames of a video clip with different intervals, so that the model can be capable of dealing with motion speed variance.

Due to the large amount of video data, spatial information had been overlooked in video captioning due to the high computational cost. But in image captioning, spatial information is widely utilized through attention. In "Show, attend and tell: Neural image caption generation with visual attention" (Xu et al., ICML, 2015), two forms of attention mechanism are proposed for image captioning. One is stochastic hard attention, which selects a single image region according to a multinoulli distribution and requires Monte Carlo sampling to train. The other is a differentiable approximation of the former, which computes weights for all the image regions and then a weighted sum over all the regional features. Although the hard attention was shown to give better performance, later researchers have preferred the soft approximation for its ease of training. In "Attention correctness in neural image captioning" (Liu et al., AAAI, 2017), it is shown that if supervision for attention is available during training image captioning models, the trained models can better locate regions that are relevant to the generated captions. However, due to the vast amount of video data, there are no such fine-grained spatial annotation in existing video captioning datasets.

Recently, there are works that try to incorporate spatial attention in video captioning. Li et al. apply region-level (spatial) soft attention to every video frame and then frame-level (temporal) attention to all the frames to obtain a multi-level attention model for video captioning (see "MAM-RNN: multi-level attention model based RNN for video captioning", IJCAI, 2017). Yang et al. propose to generate spatial attention under the guidance of global feature, which is the mean-pooled regional features (see "Catching the temporal regions-of-interest for video captioning", ACM MM, 2017). They also designed a Dual Memory Recurrent Model (DMRM) to incorporate the information of previously encoded global and regional features. The MAM-RNN applies spatial attention in the encoding stage followed by temporal attention in the decoding stage. The spatial attention maps are directly propagated during encoding. However, in the works of Li et al. and Yang et al., the spatial attentions are generated from the regional features and recurrent states of the RNNs, without direct guidance.

"Two-stream convolutional networks for action recognition in videos" (Simonyan et al., NIPS, 2014) and "Temporal segment networks: Towards good practices for deep action recognition" (Wang et al., ECCV, 2016) have shown that CNNs trained on multi-frame dense optical flow is able to achieve good action recognition performance in spite of limited amount of training data. Although the C3D network (see "Learning spatiotemporal features with 3d convolutional networks", Tran et al., ICCV, 2015), which operates on consecutive RGB frames has also been proven to be successful for recognizing action in videos, it requires training on large-scale datasets. As a result, video captioning approaches have always used motion information from C3D as just another modality for fusion only. Venugopalan et al. tries to feed optical flow to a CNN pre-trained on UCF101 video dataset for feature extraction and then for multi-modal fusion. None of these works have used optical flow as guidance for visual attention.

There is a need to provide a new and different mechanism for video captioning.

SUMMARY

Different from many existing works, which focus on fully exploiting the multimodal information in videos, in this invention we aim at designing a video captioning model that effectively attends to spatial regions-of-interest under the guidance of motion information in videos. That is, in this application the focus is to exploit the spatial information of video frames and to generate spatial attention from a more explicit clue: optical flows.

We use dense optical flow to explicitly capture the motion between consecutive frames. First, stacked dense optical flow extracted around sampled key frame is fed to a CNN to compute a rough spatial attention map. To utilize the relation between attention maps, we then designed a gated attention recurrent unit (GARU) to incorporate attention information from previous frames. The GARU outputs refined attention map, and the regional features are aggregated into a discriminative global representation with the help of the attention map.

Our approach is also in a sequence-to-sequence manner, and can be divided into encoding and decoding stages.

In one aspect of this invention, it is provided a system for video captioning, comprising an encoding module and a decoding module, the encoding module comprises a plurality of encoding units each receiving a set of video frames, wherein the sets of video frames received by two neighboring encoding units are in chronological order; and the encoding units each producing a spatially attended feature, so that the plurality of encoding units produce a spatially attended feature sequence; the decoding module comprises a decoding unit chronologically receiving a temporally attended feature obtained from the spatially attended features sequence.

Preferably, the encoding units each comprises
a convolutional neural network (CNN) ($\Phi_c$) which operates on the set of video frames (F),
a rough attention map ($A_n^r$) produced by the CNN,
a local feature map ($L_n$),
a global feature vector ($G_n$) produced by spatially mean-pooling from the local feature map $L_n$, and
a gated attention recurrent unit (GARU) incorporating the rough attention map ($A_n^r$) and the global feature vector ($G_n$), and producing a refined attention map ($A_n$).

Preferably, a spatially attended feature ($G_n^a$) is further produced as a weighted sum of the local feature map ($L_n$) with the refined attention map ($A_n$) being the weights.

Preferably, the decoding unit comprises a first Long Short-Term Memory (LSTM) decoder for receiving an input word sequence, a second LSTM decoder, the input of which is connected to the output of the first LSTM decoder, and a fully connected layer, the input of which is connected to the output of the second LSTM decoder.

Preferably, a temporally attended feature ($G^{(t)}$) produced from a sequence of the spatially attended feature ($G_1^a$, $G_2^a$, ..., $G_N^a$) is input to the second LSTM decoder.

Preferably, the set of video frames are stacked optical flow images.

In another aspect of this invention, it is provided a system for video captioning, comprising an encoding module and a decoding module, the encoding module comprising a plurality of encoding units, each comprises
a convolutional neural network (CNN) ($\Phi_c$) which operates on stacked optical flow images (F),
a rough attention map ($A_n^r$) produced by the CNN,
a local feature map ($L_n$),
a global feature vector ($G_n$) produced by spatially mean-pooling from the local feature map $L_n$, and
a gated attention recurrent unit (GARU) which incorporates the rough attention map ($A_n^r$) and the global feature vector ($G_n$),
wherein the GARU produces a refined attention map ($A_n$), and a spatially attended feature ($G_n^a$) is further produced as a weighted sum of the local feature map ($L_n$) with the refined attention map ($A_n$) being the weights; and wherein a prior hidden state ($h_{n-1}$) of the GARU of a prior encoding unit ($E_{n-1}$) is input to the GARU of the present encoding unit ($EU_n$), and the prior hidden state for the first encoding unit is set as zero; and
wherein the stacked optical flow images operated by the CNN of the next encoding unit ($EU_{n+1}$) is temporally sequential to the stacked optical flow images operated by the CNN of the present encoding unit ($EU_n$);

the decoding module comprising a decoding unit, which comprises
a first Long Short-Term Memory (LSTM) decoder for receiving an input word sequence, a second LSTM decoder, the input of which is connected to the output of the first LSTM decoder, a fully connected layer, the input of which is connected to the output of the second LSTM decoder, wherein a temporally attended feature ($G^{(t)}$) produced from a sequence of the spatially attended feature ($G_1^a$, $G_2^a$, ..., $G_N^a$) is input to the second LSTM decoder.

Preferably, the input word sequence is encoded as one-hot vectors ($x_1, x_2, \ldots, x_T$).

Preferably, each vector of the one-hot vectors ($x_1, x_2, \ldots, x_T$) is multiplied with a random-initialized word embedding matrix.

Preferably, at each time step (t), the first LSTM decoder is trained to predict a t-th word conditioned on a previous t−1 word and a concatenation ($G^a$) of the sequence of spatially attended feature ($G_1^a$, $G_2^a$, ..., $G_N^a$).

Preferably, the input word sequence is a ground truth sentence.

Preferably, the temporally attended feature ($G^{(t)}$) is obtained from the formula $$G^{(t)} = \sum_{n=1}^{N} \beta_n^{(t)} G_n^a, \qquad (9)$$

where $\beta_1^{(t)}, \beta_2^{(t)}, \ldots, \beta_N^{(t)}$ are the attention weights dynamically decided at t-th time step.

Preferably, the stacked optical flow images are stacked as a tensor with a shape (N, HI, WI, 2M), wherein N is the number of the key frames of the video for captioning, M is the number of the frames centered at each key frame, and HI and WI are respectively the height and width of the optical flow images.

Preferably, in the GARU it is computed as follows:

$$r_n = \sigma(W^{(r)}A_n^r + U^{(r)}h_{n-1} + V^{(r)}G_n), \quad (6)$$
$$z_n = \sigma(W^{(z)}A_n^r + U^{(z)}h_{n-1} + V^{(z)}G_n),$$
$$h'_n = \tanh(W^{(h)}A_n^{(r)} + r_n \odot U^{(h)}h_{n-1}),$$
$$h_n = h_{n-1} \odot z_n + h'_n \odot (1 - z_n),$$

where α stands for the sigmoid function and ⊙ stands for element-wise multiplication. U, V and W with different superscripts are all trainable parameters. Note that $h_{n-1}$ is equivalent to $A_{n-1}$; $r_n$ is the reset gate that controls how much information from previous hidden state that should be kept; $z_n$ is the element-wise update gate that directly controls how much of the previous attention map should be kept.

Preferably, the initial state of the GARU is set to zero.

In a further aspect of this invention, it is provided a method for video captioning, comprising the steps:

receiving a plurality of sets of video frames by using a plurality of encoding units, wherein each encoding unit receives only one set of video frames and each set of video frames is received by only one encoding unit, and the sets of video frames received by two neighboring encoding units are in chronological order; and producing a spatially attended feature by each encoding units, so that a spatially attended feature sequence is produced by the plurality of encoding units;

chronologically receiving a temporally attended feature by using one decoding unit, wherein the temporally attended feature is obtained from the spatially attended features sequence.

Preferably, the received set of video frames is operated with a convolutional neural network (CNN) ($\Phi_c$) and then a rough attention map ($A_n^r$) is produced from the set of video frames by the CNN Preferably, a global feature vector ($G_n^a$) is produced by spatially mean-pooling from a local feature map $L_n$, then the rough attention map ($A_n^r$) and the global feature vector ($G_n^a$) is incorporated by a gated attention recurrent unit (GARU), and then a refined attention map ($A_n$) is produced by the GARU.

Preferably, a spatially attended feature ($G_n^a$) is produced as a weighted sum of the local feature map ($L_n$) with the refined attention map ($A_n$) being the weights.

Preferably, a prior hidden state ($h_{n-1}$) of the GARU of a previous encoding unit ($EU_{n-1}$) of the two neighboring encoding units is input to the GARU of the successive encoding unit ($EU_n$) of the two neighboring encoding units, and the prior hidden state for the first encoding unit is set as zero.

Preferably, the temporally attended feature is received by the decoding unit iteratively.

Preferably, the decoding unit comprises a first Long Short-Term Memory (LSTM) decoder, a second LSTM decoder, and a fully connected layer that are in serial connection, while the temporally attended feature is input to the second LSTM decoder.

This application has provided a much improved approach. In this application, a novel video captioning framework named Motion Guided Spatial Attention (MGSA) is provided, which utilizes optical flow to guide spatial attention; recurrent relations between consecutive spatial attention maps is introduced, which can give a boost to captioning performance, and a new recurrent unit called Gated Attention Recurrent Unit (GARU) is designed for this purpose.

BRIEF DESCRIPTION OF DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention. In addition, it is understood that any titles or sub-titles used in this application are only for illustrative, other than limitative purpose.

The patent or application file contains at least one drawing executed in color. Copies of this patent or patent application publication with color drawing(s) will be provided by the Office upon request and payment of the necessary fee.

EMBODIMENTS

Figure 1:
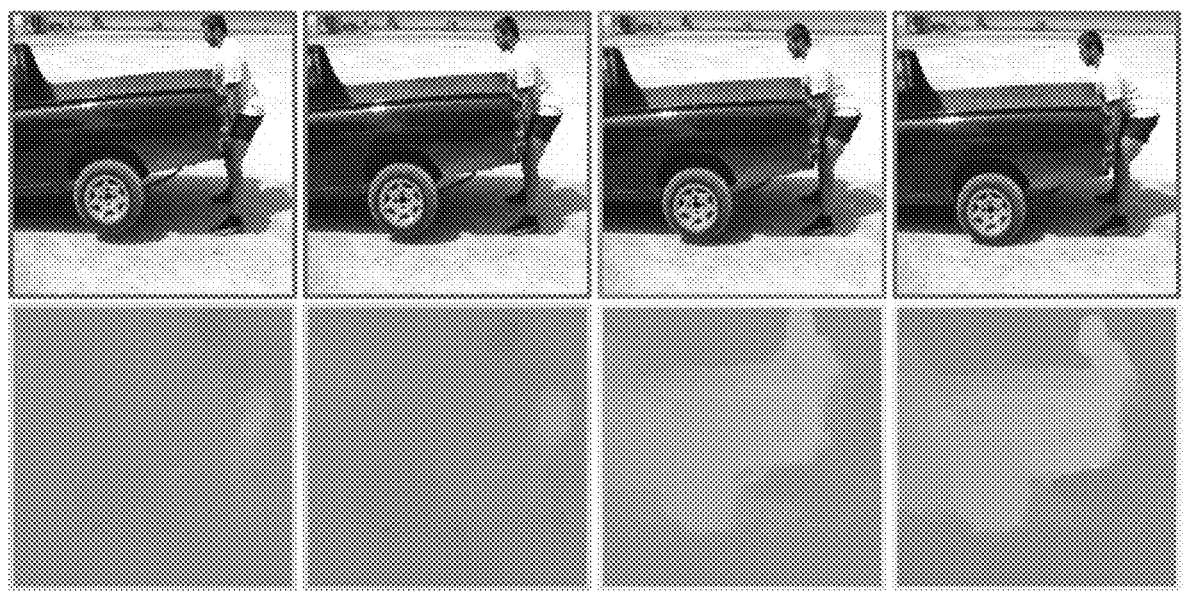
FIG. 1 shows the example video frames with optical flow in the bottom row according to this invention.

Before explaining at least one embodiment of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

Embodiments of the subject matter and the functional operations described in this specification optionally can be implemented in digital electronic circuitry, or in computer software, firmware, or hardware, including the structures disclosed in this specification and their structural equivalents, or in combinations of one or more of them. Embodiments of the subject matter described in this specification can, for example, be implemented as one or more computer program products, e.g., one or more modules of computer program instructions encoded on a computer readable medium for execution by, or to control the operation of, data processing apparatus.

The computer readable medium can be a machine-readable tangible storage device, a machine-readable tangible storage substrate, a tangible memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A computer program (also known as a program, software, software application, script, or code), can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

FIG. 1 shows the example video frames with optical flow in the bottom row. Videos by nature have clear indication of where the actions/events are happening, that is the motion between video frames. In this application, the spatial attention is guided by optical flow, which can capture the pattern of apparent motion between consecutive video frames. As shown in FIG. 1, the motion captured by optical flow in both horizontal and vertical direction is a strong indication of the action and the related objects in the video (the frame in red box is the sampled key frame, while the flow images in green and yellow boxes are the horizontal and vertical component of the optical flow computed around the key frame, respectively). Besides, the actions in videos is related across time. So in this application it is also considered the temporal relation between attention maps, and proposed a GRU-like Gated Attention Recurrent Unit (GARU) to model this relationship.

Figure 2A:
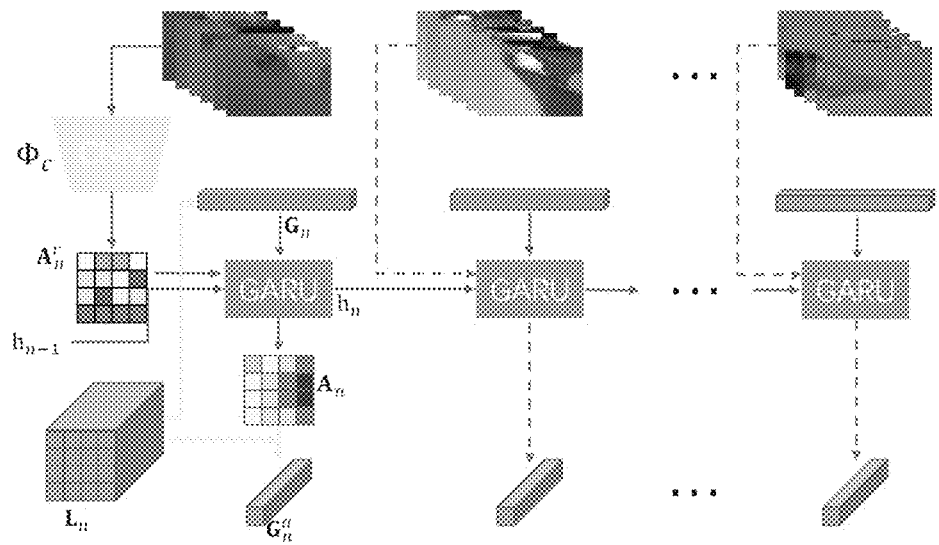
FIG. 2a shows the architecture of MGSA for video feature encoding according to this application.

FIG. 2a shows the architecture of MGSA for video feature encoding according to this application; wherein $A_n^r$ is the rough attention map produced by the CNN that operates on stacked optical flow images. $G_n$ is obtained by spatially mean-pooling $L_n$. $G_n^a$ is the weighted sum of $L_n$ with $A_n$ as the weights. Please note that corresponding components in the dashed connections have been omitted for clarity.

Figure 2B:
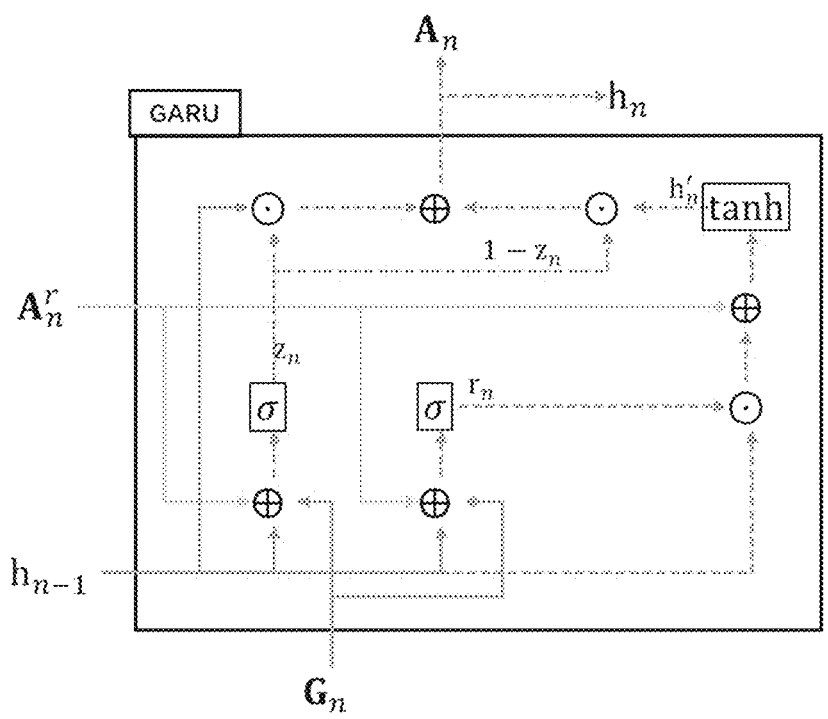
FIG. 2b shows the details of GARU according to this application.

FIG. 2b shows the details of GARU, wherein solid lines stands for weighted connections, i.e., the inputs are multiplied by a weight matrix, and dashed lines stands for direct connections; $\odot$, $\oplus$ and $\alpha$ stands for element-wise multiplication, addition and sigmoid function, respectively.

Given a video, N frames are uniformly sampled as the key frames. Horizontal and vertical components of optical flow for M frames centered at each key frame are computed to capture the short-term motion information. These optical flows are stacked as a tensor F with shape (N; $H_f$; $W_f$; 2M), where $H_f$ and $W_f$ are respectively the height and width of the frames (A tensor T with shape ($N_0$, $N_1$, $N_{D-1}$) is an array of rank D, and its axis i has length Ni. Subscript is used to index sub-tensors, e.g., $T_i$ stands for T's i-th sub-tensor in the first axis, which has shape ($N_1$, ..., $N_{D-1}$)). The video frames are fed to a pre-trained CNN to extract regional features. Generally, the activations of the last convolutional layer of the CNN is taken. The resulting feature is also a tensor L with shape (N; H; W; D), where D is the number of output channels of the pre-trained CNN, and H and W are the spatial dimensions.

As FIG. 2a shows, the stacked flows are fed to a custom CNN denoted by $\Phi_c$ and the output will be a tensor $A_r$ with shape (N; H; W; 1), or (N; H; W) if the last dimension is squeezed. Each sub-tensor of $A_r$, which is denoted as $A_n^r$ and has shape of (H; W), is the rough spatial attention map of each corresponding frame.

The rough attention map itself can also be used to aggregate the regional features. But in this invention it is preferable to refine it by considering the interrelationship of the attention maps across time. Thus, the rough attention maps are then sequentially processed by a Gated Attention Recurrent Unit (GARU) designed according to this invention to incorporate previous attention maps. Global feature vector $G_n$, which is the spatially mean-pooled $L_n$ with length D, is also fed to the GARU to provide high-level information of the key frame. The refined attention maps A is applied to weigh L, obtaining the attended global representation of the corresponding frames, denoted as $G^a$. The above encoding stage can be formalized as below:

$$A^r = \Phi_c(F), \quad (1)$$

$$h_n, A_n = GARU(h_{n-1}, A_n^r, G_n), \quad (2)$$

$$G^a f_{att}(L_n, A_n), \quad (3)$$

where n=1, 2, .... N and fatt is the attention operation along the spatial dimensions of $L_n$ with $A_n$, the attention map refined by GARU as the weights; $h_n$ is the hidden state of GARU; $G^a$ is the concatenation of $G_1^a$, $G_2^a$, ..., $G_N^a$.

Figure 3:
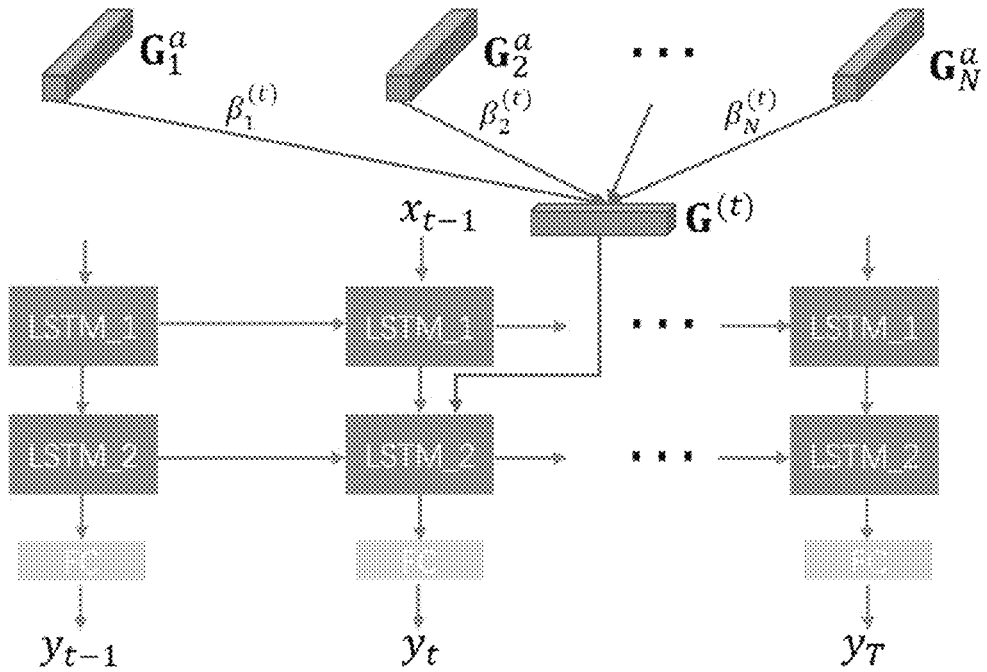
FIG. 3 shows the decoding stage of this invention.

FIG. 3 shows the decoding stage of this invention, wherein a stack of two LSTMs is also used.

The input word sequence are encoded as one-hot vectors ($x_1, x_2, ..., x_T$), where T is the length of the sentence. Each vector of the one-hot vectors ($x_1, x_2, ..., x_T$) is then multiplied with a random-initialized word embedding matrix, and thus the one-hot vectors are embedded to a d-dimensional vectors. Preferably, d is 512 in this application, determined by experiments; however, the person in the art will understand that d could be other numbers, like 256, 128, and etc. The embedding is trained jointly with the model of this application.

At each time step t, the decoder is trained to predict the t-th word conditioned on the previous t−1 words and $G^a$. The output of the decoder is thus a conditional probability distribution:

$$p(x_t | x_1, x_2, ..., x_{t-1}, G^a; \theta), \quad (4)$$

where $\theta$ stands for all the trainable model parameters.

The objective function as negative log-likelihood is also defined as:

$$Loss = -\sum_{t=1}^{T} \log p(x_t | x_1, x_2, ..., x_{t-1}, G^a; \theta). \quad (5)$$

The model learns to minimize the negative log-likelihood by stochastic gradient descent during training.

In video action recognition, the CNNs that take optical flow as input are designed to have similar or identical architecture as the CNNs that process RGB frames, which are usually deep. Unlike recognizing actions and events, learning spatial attention map from optical flow images is an easier task. Since optical flow already explicitly captures the motion, which is a good hint for where the model show attend to. Thus, for this task, in this invention it is designed a 5-layer CNN, i.e., the $\Phi_c$ in Eq. (1). Max-pooling is interleaved with convolution to reduce the spatial resolution and increase receptive field.

It is also experimented with deeper CNN architectures and found that the increase of performance is not significant. Thus in this invention it is preferably chosen a lightweight CNN for better training efficiency.

The rough spatial attention map $A^r$ produced by $\beta_c$ is solely generated from short-term motion information around a key frame. While this attention map is already applicable, it is preferred to take one step further. Since an action in video is continuous in time, the attention maps of nearby key frames should also be related. Therefore, a GRU-like gated recurrent unit (named GARU) is designed to incorporate previous spatial attention map when generating the current one.

As shown in FIG. 2, the proposed GARU take the rough attention map generated by the flow CNN, $A_n^r$ and the global feature of the key frame, $G_n$. At each time step, GARU produces the refined attention map $A_n$, and propagates the state $h_n$ to the next time step. The detailed computation of GARU is as follows:

$$r_n = \sigma(W^{(r)} A_n^r + U^{(r)} h_{n-1} + V^{(r)} G_n), \quad (6)$$

$$z_n = \sigma(W^{(z)} A_n^r + U^{(z)} h_{n-1} + V^{(z)} G_n),$$

$$h'_n = \tanh(W^{(h)} A_n^{(r)} + r_n \odot U^{(h)} h_{n-1}),$$

$$h_n = h_{n-1} \odot z_n + h'_n \odot (1 - z_n),$$

where $\alpha$ stands for the sigmoid function and $\odot$ stands for element-wise multiplication. U, V and W with different superscripts are all trainable parameters. Note that $h_{n-1}$ is equivalent to $A_{n-1}$; $r_n$ is the reset gate that controls how much information from previous hidden state that should be kept; $z_n$ is the element-wise update gate that directly controls how much of the previous attention map should be kept. The initial state of GARU is simply set to zero.

The attention weights of every region is obtained by applying softmax function to $A_n$ along the spatial dimensions:

$$\alpha_{nhw} = \frac{\exp(A_{nhw})}{\sum_{h=1}^{H}\sum_{w=1}^{W}\exp(A_{nhw})}. \qquad (7)$$

Then the attended global feature by a weighted sum over the regional features:

$$G_n^a = \sum_{h=1}^{H}\sum_{w=1}^{W}\alpha_{nhw}L_{nhw}. \qquad (8)$$

Eq. 7 and Eq. 8 also complement the details of the $f_{att}$ operation in Eq. 3. The generated global feature sequence $(G_1^a, G_2^a, \ldots, G_N^a)$ is the encoded feature representation for each frame and is fed to the decoder for sentence generation.

Temporal attention in decoding stage is used to improve the captioning performance. As shown in FIG. 3, we further apply temporal attention to the spatially-attended feature sequence $(G_1^a, G_2^a, \ldots, G_N^a)$ at each word generation step to further obtain a temporally attended feature:

$$G^{(t)} = \sum_{n=1}^{N}\beta_n^{(t)}G_n^a, \qquad (9)$$

where $\beta_1^{(t)}, \beta_2^{(t)}, \ldots, \beta_N^{(t)}$ are the attention weights dynamically decided at t-th time step. The computation of $\beta_n^{(t)}$ relies on the recurrent states of decoder LSTMs, which stores the information of previously seen words and features, and is computed as $$h_t^{(1)}, c_t^{(1)} = \text{LSTM\_1}(x_{t-1}, (h_{t-1}^{(1)}, c_{t-1}^{(1)})), \qquad (10)$$

$$h_t^{(2)}, c_t^{(2)} = \text{LSTM\_2}([h_t^{(1)}, G^{(t)}], (h_{t-1}^{(2)}, c_{t-1}^{(2)})),$$

where $h_t^{(l)}, c_t^{(l)}$ are the hidden and cell state of the l-th LSTM at time step t, and [•] stands for tensor concatenation. $\beta_n^{(t)}$ is then computed as $$e_n^{(t)} = W_A^T\tanh(W[h_t^{(1)}, h_t^{(2)}] + UG_n^a + b), \qquad (11)$$

$$\beta_n^{(t)} = \frac{\exp(e_n^{(t)})}{\sum_{n=1}^{N}\exp(e_n^{(t)})},$$

where $W_A$, $W$, $U$ and $b$ are trainable parameters that are shared across all time steps. It is used a single output layer that maps the output of LSTM_2 into a distribution over the vocabulary:

$$y_t = softmax(W^{(o)}h_t^{(2)}) \qquad (12)$$

$$= p(x_t | x_1, x_2, \ldots, x_{t-1}, G^a; \theta).$$

During testing time, the ground truth sentence $(x_1, x_2, \ldots, x_T)$ is not given. Thus the input to the LSTM 1 is the previous word prediction of the model:

$$x_t = \underset{w \in V}{\arg\max}\, p(w | x_1, x_2, \ldots, x_{t-1}, G^a; \theta), \qquad (13)$$

where V is the vocabulary. The whole framework can be trained in an end-to-end manner.

EXPERIMENTS

We have used two datasets for our experiments: MSVD dataset and MSR-VTT dataset.

The MSVD dataset is a widely used benchmark dataset for video captioning methods. It contains 1,970 videos clips collected from YouTube with an average duration of 9.6 seconds. Each video has around 40 human annotated sentences. In our experiments, we follow the split settings in "Learning multimodal attention LSTM networks for video captioning" (Xu et al., ACM MM, 2017) and "Describing videos by exploiting temporal structure" (Yao et al., ICCV, 2015): 1,200 videos for training, 100 videos for validation and 670 videos for testing. The resulting training set has a vocabulary size of 9,657.

The MSR-VTT dataset is a large scale open-domain video captioning dataset. It contains 10,000 video clips with an average duration of 14.9 seconds and 20 human annotated captions per clip. Besides, each clip has an expert-defined category label. In this application we follow the standard dataset split in the dataset paper: 6,513 video for training, 497 videos for validation and 2,990 videos for testing. The resulting training set has a vocabulary size of 23,393.

For every video, we uniformly sample 20 key frames. Optical flows in both horizontal and vertical directions are computed for 6 consecutive frames centered at each key frame. The flow magnitude is clipped to [−20, 20] and then normalized to [0, 255]. The flow images are then cropped and resized so that the CNN outputs match the spatial size of image features. Static image features is extracted from models pre-trained on the ImageNet: GoogleNet (see "Going deeper with convolutions", Szegedy et al., CVPR, 2015) and InceptionResnet-V2 (see "Inception-v4, inception-resnet and the impact of residual connections on learning", Szegedy et al., AAAI, 2017). Futures from the C3D network are also included to model the short-term motion information. For the MSR-VTT dataset, we also include audio feature (BoAW, see "Softening quantization in bag-of-audio-words", Pancoast et al., ICASSP, 2014) and the coarse category information.

The LSTMs used in our model all have 1024 hidden units and the word embedding size is set to 512. The optical flow images are normalized so that their pixel values are in the range [−1, 1] before being fed to CNN. We apply dropout with rate of 0.5 to all the vertical connections of LSTMs and L2 regularization with a factor of $5\times10^{-5}$ to all the trainable parameters to mitigate overfitting. We apply ADAM optimizer with a learning rate of $10^4$ and batch size of 32 to minimize the negative log-likelihood loss. All the components of our model and training are implemented in Tensorflow. On a commodity GTX 1080 Ti GPU, the times needed to extract frame features and optical flows for a typical 10-second video clip are 400 ms and 800 ms, respectively. After feature extraction, our model can generate caption for a video in 45 ms.

During evaluation/testing, we use beam search with size 5 for sentence generation. Three common metrics are employed in video captioning task: BLEU@4, CIDEr, and METEOR. All the metrics are computed by the codes from the Microsoft COCO Evaluation Server.

It is chosen to compare our proposed approach with the following state of the art methods. Their major approaches can be grouped to three categories: Temporal attention (1,2,3), spatial attention (4,5,6) and multi-modal fusion (7,8,9,10).

1. HRNE with Attention ("Hierarchical recurrent neural encoder for video representation with application to captioning", Pan et al., CVPR, 2016). HRNE considers the hierarchical structure of the video when encoding, and decodes the sentence with temporal attention.
2. Soft Attention (SA) ("Describing videos by exploiting temporal structure", Yao et al., ICCV, 2015).
3. hLSTMat ("Hierarchical LSTM with adjusted temporal attention for video captioning", Song et al., IJCAI, 2017). In decoding stage, hLSTMat adaptively selects how much of the temporally attended features should be used for generating a specific word.
4. DMRM ("Catching the temporal regions-of-interest for video captioning", Yang et al., ACM MM, 2017).
5. MAM-RNN ("MAM-RNN: multi-level attention model based RNN for video captioning", Li et al., IJCAI, 2017).
6. Dense Caption ("Weakly supervised dense video captioning", Shen et al., CVPR, 2017). This approach aims to select multiple spatial region sequences via a mapping between frame regions and lexical labels for dense video captioning.
7. MA-LSTM ("Learning multimodal attention LSTM networks for video captioning", Xu et al., ACM MM, 2017). MA-LSTM is conceptually similar to Attention Fusion, except that modality-wise fusion is done by the proposed Child-Sum fusion unit.
8. Attention Fusion ("Attention-based multimodal fusion for video description", Hori et al., ICCV, 2017). In decoding stage, temporal attentions are computed for multiple modalities and then fused by a modality-wise attention.
9. M&M-TGM ("Video captioning with guidance of multi-modal latent topics", Chen et al., ACM MM, 2017). M&M-TGM uses a multi-modal multi-task training scheme which learns to jointly predict the captions and topic of the videos.
10. MM2016 VTT Challenge winners ("Describing videos using multi-modal fusion", Jin et al., ACM MM, 2016; "Multimodal video description", Ramanishka et al., ACM MM, 2016; "Frame- and segment level features and candidate pool evaluation for video caption generation", Shetty et al., ACM MM, 2016). These approaches mainly use multimodal fusion encoders to fully exploit the visual, motion and audio information in videos.

Table 1 shows the captioning performance comparison on MSVD and MSR-VTT.

TABLE 1

| Dataset | MSVD | | | | MSR-VTT | | | |
|---|---|---|---|---|---|---|---|---|
| Model | Features | B@4 | C | M | Features | B@4 | C | M |
| HRNE w/ Attention (Pan et al. 2016) | G | 43.8 | — | 33.1 | — | — | — | — |
| SA (Yao et al. 2015) | G | 41.9 | 51.7 | 29.6 | V + C | 36.6 | — | 25.9 |
| hLSTMat (Song et al. 2017) | G | 48.5 | — | 31.9 | R-152 | 38.3 | — | 26.3 |
| DMRM w/o SS (Yang, Han, and Wang 2017) | G | 50.0 | 73.2 | 33.2 | — | — | — | — |
| MAM-RNN (Li, Zhao, and Lu 2017) | G | 41.3 | 53.9 | 32.2 | — | — | — | — |
| Dense Caption (Shen et al. 2017) | — | — | — | — | R-50 + C + A | 41.4 | 48.9 | 28.3 |
| MA-LSTM (Xu et al. 2017) | G + C | 52.3 | 70.4 | 33.6 | G + C + A | 36.5 | 41.0 | 26.5 |
| Attention Fusion (Hon et al. 2017) | V + C | 52.4 | 68.8 | 32.0 | V + C + A | 39.7 | 40.0 | 25.5 |
| M&M-TGM (Chen et al. 2017) | I + C | 48.76 | 80.45 | 34.36 | I + C + A | 44.33 | 49.26 | 29.37 |
| v2t_navigator (Jin et al. 2016) | — | — | — | — | C + A | 40.8 | 44.8 | 28.2 |
| Aalto (Shetty and Laaksonen 2016) | — | — | — | — | G + C | 39.8 | 45.7 | 26.9 |
| VideoLab (Ramanishka et al. 2016) | — | — | — | — | R + C + A | 39.1 | 44.1 | 27.7 |
| MGSA(G) | G | 49.5 | 74.2 | 32.2 | G | 39.9 | 45.0 | 26.3 |
| MGSA(I) | I | 53.0 | 86.4 | 34.7 | I | 41.7 | 48.1 | 27.5 |
| MGSA(I + C) | I + C | 53.4 | 86.7 | 35.0 | I + C | 42.4 | 47.5 | 27.6 |
| MGSA(I + A + C) | — | — | — | — | I + A + C | 45.4 | 50.1 | 28.6 |

It is noted the features used for fare comparison, where G, V, C, R-N, I and A denote GoogleNet, VGGNet, C3D, N-layer ResNet, Inception-ResNet-V2, and audio features, respectively. Note that audio is not available on MSVD. "—" means that the authors did not report the corresponding results.

Table 2 shows comparison of model variants on MSVD.

TABLE 2

| Model | B @ 4 | C | M |
|---|---|---|---|
| Spatial Attention | 49.8 | 72.2 | 32.9 |
| Spatial Attention w/GARU | 51.0 | 81.8 | 34.0 |
| MGSA w/o GARU | 51.0 | 83.3 | 33.1 |
| MGSA w/GARU | 53.0 | 86.4 | 34.7 |

First, experiments are performed on the MSVD dataset to test the effectiveness of individual components of our model. As shown in Table 2, the Spatial Attention is a simplified model of MAM-RNN with the propagation of spatial attention map removed. This modification is made to show the effectiveness of our proposed GARU, which also has the ability of relating attention maps. It can be observed that for both Spatial Attention and MGSA, adding GARU to incorporate the relations of attention maps across time can significantly improve the performance regarding the CIDEr measure: the relative improvement for Spatial Attention and MGSA is 13.3% and 5.6%, respectively. By comparing MGSA to Spatial Attention, it is shown that even without considering the interrelationship of spatial attention maps, motion-guided attention outperforms spatial attention computed from regional features. Regarding the CIDEr measure, the relative improvement of our MGSA over Spatial Attention is 15.4%. Overall, these comparisons of model variants prove both of our proposed MGSA and GARU to be effective.

Our complete model, i.e., the MGSA w/ GARU is compared in Table 2 to the state of the art models on MSVD. The results are summarized in Table 1. Our approach outperforms approaches which only exploit the temporal structure of videos (HRNE, hLSTMat and SA). This apparently shows that exploiting spatial information in video frames can boost video captioning performance. For models based on spatial attention, MAM-RNN is the most related approach to ours. When both using GoogleNet features, ours significantly outperforms MAM-RNN. This can be attributed to the usage of motion-guided attention and GARU. As for another related approach that utilize spatial attention, DMRM, our approach achieves on-par performance with it. For the multi-modal fusion methods, ours already outperform them even without fusing multiple features (MGSA (I)). Our full model (MGSA(I+C)) significantly outperforms the best competitor M&M TGM with relative improvements of 9.5%, 7.8% and 1.9% for BLEU@4, CIDEr and METEOR, respectively.

The performance comparison on MSR-VTT is also summarized in Table 1. MGSA again outperforms spatial and temporal attention methods. Notably, most approaches on this dataset are based on multi-modal fusion. Since the videos of MSRVTT have audio channel and coarse category label, when multi-modal features is not used, MGSA(I) can surpass most of these methods. While our focus in this work is learning spatial attention, our method is compatible with multi-modal information and is expected to gain a performance boost by adding more features to the attended visual feature, i.e., the $G^{(t)}$ in the decoding stage. When multi-modal features including audio (A) and short-term motion (C) are incorporated, the full model, MGSA(I+A+C) outperforms all other methods. To summarize, the results achieved by our methods are surpassing the current state of the art on both datasets.

To gain an intuition of the spatial attention learned by our model, it is presented some example sentences generated by different models along with the attention maps generated by our model (MGSA w/ GARU). In order to demonstrate the effectiveness of motion-guided attention, it is selected scenes with different degrees of dynamics.

Figure 4:
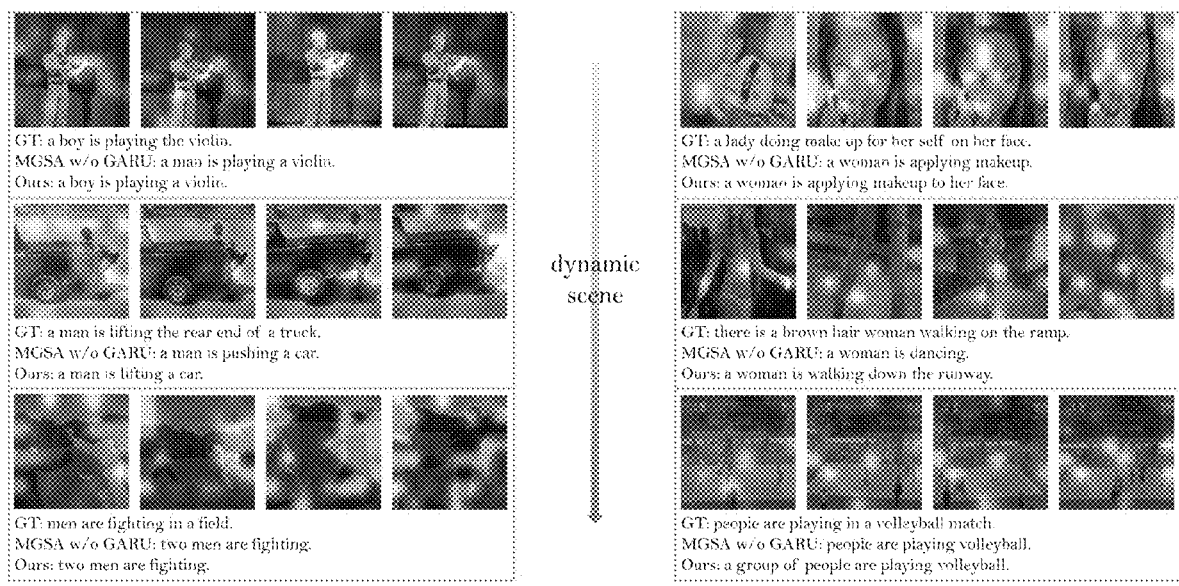
FIG. 4 shows sample captions generated by the model according to this application with and without GARU.

FIG. 4 shows sample captions generated by the model according to this application with and without GARU. The corresponding attention maps are generated by our model with GARU and visualized as heatmaps. The three rows to the left and right are from the MSVD and MSR-VTT, respectively. From top to bottom, the scenes are more and more dynamic.

In FIG. 4, we can see that our model can generate relevant sentences while attending to the important regions of the frames. For example, in the "man lifting car" video, the important region is the man and the car. They can both be captured by optical flow, and our model can then generate accurate attention maps. It is also shown that without GARU, the model can make mistakes in distinguishing the actions such as "pushing/lifting" and "walking/dancing". This indicates that considering the interrelationship between attention maps is essential. For relatively static scenes like in the "playing violin" video, our model can capture the slight action of the person and attend to the important regions. For more dynamic scenes, such as the ones in the third row, there will be dramatic changes caused by camera motion. Our model can still robustly capture the correct attention region. The reason behind this could be that inputting stacked optical flow from multiple frames can mitigate the affection of sudden changes. In the "men fighting" video, our MGSA consistently focus on the fighting men, the changing background does not disturb the attention. Interestingly, in the "volleyball match" video the camera focus rapidly switches between two sides and our MGSA always attends to the focus of the match: it tracks the volleyball.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

The invention claimed is:

1. A system for video captioning, comprising an encoding module and a decoding module, the encoding module comprising a plurality of encoding units, each comprising:
   a convolutional neural network (CNN) ($\Phi_c$) which operates on stacked optical flow images (F),
   a rough attention map ($A_n^r$) produced by the CNN,
   a local feature map ($L_n$),
   a global feature vector ($G_n$) produced by spatially mean-pooling from the local feature map $L_n$, and
   a gated attention recurrent unit (GARU) which incorporates the rough attention map ($A_n^r$) and the global feature vector ($G_n$);
   wherein the GARU produces a refined attention map ($A_n$), and a spatially attended feature ($G_n^a$) is further produced as a weighted sum of the local feature map ($L_n$) with the refined attention map ($A_n$) being the weights; and
   wherein a prior hidden state ($h_{n-1}$) of the GARU of a prior encoding unit ($EU_{n-1}$) is input to the GARU of the present encoding unit ($EU_n$), and the prior hidden state for the first encoding unit is set as zero; and
   wherein the stacked optical flow images operated by the CNN of the next encoding unit ($EU_{n+1}$) is temporally sequential to the stacked optical flow images operated by the CNN of the present encoding unit ($EU_n$); and the decoding module comprising a decoding unit, which comprises:
- a first Long Short-Term Memory (LSTM) decoder for receiving an input word sequence,
- a second LSTM decoder, the input of which is connected to the output of the first LSTM decoder, and
- a fully connected layer, the input of which is connected to the output of the second LSTM decoder;

wherein a temporally attended feature ($G^{(t)}$) produced from a sequence of the spatially attended feature ($G_1^a, G_2^a, \ldots, G_N^a$) is input to the second LSTM decoder.

2. The system of claim 1, wherein the input word sequence is encoded as one-hot vectors ($x_1, x_2, \ldots, x_T$).

3. The system of claim 1, wherein at each time step (t), the first LSTM decoder is trained to predict a t-th word conditioned on a previous t−1 word and a concatenation ($G^a$) of the sequence of spatially attended feature ($G_1^a, G_2^a, \ldots, G_N^a$).

4. The system of claim 1, wherein the input word sequence is a ground truth sentence.

5. The system of claim 1, wherein the temporally attended feature ($G^{(t)}$) is obtained from the formula $$G^{(t)} = \sum_{n=1}^{N} \beta_n^{(t)} G_n^a, \qquad (9)$$

where $\beta_1^{(t)}, \beta_2^{(t)}, \ldots, \beta_N^{(t)}$ are the attention weights dynamically decided at t-th time step.

6. The system of claim 1, wherein the stacked optical flow images are stacked as a tensor with a shape (N, $H_I$, $W_I$, 2M), wherein N is the number of the key frames of the video for captioning, M is the number of the frames centered at each key frame, and $H_I$ and $W_I$ are respectively the height and width of the frames.

7. The system of claim 1, wherein in the GARU it is computed as follows:

$$r_n = \sigma(W^{(r)} A_n^r + U^{(r)} h_{n-1} + V^{(r)} G_n), \qquad (6)$$
$$z_n = \sigma(W^{(z)} A_n^r + U^{(z)} h_{n-1} + V^{(z)} G_n),$$
$$h'_n = \tanh(W^{(h)} A_n^{(r)} + r_n \odot U^{(h)} h_{n-1}),$$
$$h_n = h_{n-1} \odot z_n + h'_n \odot (1 - z_n),$$

where $\alpha$ stands for the sigmoid function and $\odot$ stands for element-wise multiplication, wherein U, V and W with different superscripts are all trainable parameters, wherein that $h_{n-1}$ is equivalent to $A_{n-1}$; $r_n$ is the reset gate that controls how much information from previous hidden state that should be kept; $z_n$ is the element-wise update gate that directly controls how much of the previous attention map should be kept.

8. The system of claim 1, wherein the initial state of the GARU is set to zero.

* * * * *